US010862152B2

(12) United States Patent
Halttunen et al.

(10) Patent No.: US 10,862,152 B2
(45) Date of Patent: Dec. 8, 2020

(54) MICROBIAL FUEL CELL ARRANGEMENT AND METHOD FOR OPERATING IT

(71) Applicant: Kemira Oyj, Helsinki (FI)

(72) Inventors: Sakari Halttunen, Espoo (FI); Jussi Ruotsalainen, Espoo (FI); Hannele Havansi, Espoo (FI); Mehrdad Hesampour, Espoo (FI)

(73) Assignee: Kemira Oyj, Helsinki (FI)

( * ) Notice: Subject to any disclaimer, the term of this patent is extended or adjusted under 35 U.S.C. 154(b) by 135 days.

(21) Appl. No.: 16/064,066

(22) PCT Filed: Dec. 29, 2016

(86) PCT No.: PCT/FI2016/050934
§ 371 (c)(1),
(2) Date: Jun. 20, 2018

(87) PCT Pub. No.: WO2017/115014
PCT Pub. Date: Jul. 6, 2017

(65) Prior Publication Data
US 2019/0006693 A1    Jan. 3, 2019

(30) Foreign Application Priority Data
Dec. 29, 2015   (FI) ..................................... 20156023

(51) Int. Cl.
*H01M 8/16* (2006.01)
*B01D 61/06* (2006.01)
(Continued)

(52) U.S. Cl.
CPC ............ *H01M 8/16* (2013.01); *B01D 61/025* (2013.01); *B01D 61/06* (2013.01); *C02F 1/441* (2013.01);
(Continued)

(58) Field of Classification Search
None
See application file for complete search history.

(56) References Cited

U.S. PATENT DOCUMENTS

| 2009/0142627 | A1 | 6/2009 | Shimomura et al. |
| 2012/0321966 | A1 | 12/2012 | Wallin et al. |

(Continued)

FOREIGN PATENT DOCUMENTS

| JP | 2015072820 A | 4/2015 |
| KR | 20150069475 A | 6/2015 |

(Continued)

OTHER PUBLICATIONS

Dow Chemical Tehnical Manual Excerpt for Filmtech Membranes "Basics of RO and NF: Principles of reverse osmosis and nanofiltration" published Oct. 2003 as Dow Chemical Form. No. 609-2003-1004 (Year: 2003).*

(Continued)

*Primary Examiner* — Wyatt P McConnell
(74) *Attorney, Agent, or Firm* — Berggren LLP

(57) ABSTRACT

The invention relates to a microbial fuel cell arrangement comprising a cell reactor. The cell reactor comprises a membrane, which has an active surface and a support surface, as well as a pore size of ≤10 nm and/or a divalent ion rejection of ≥50%; an anode and a cathode, which are connected with each other through an external electrical circuit; an influent inlet for liquid medium arranged at the active surface side of the membrane and at least one permeate outlet arranged at the support surface side of the membrane; an influent line connected to the influent inlet; a concentrate outlet, arranged at the active surface side of the membrane and connected to a concentrate line; and pressurisation means for creating pressure difference between the active surface side and support surface side of the (Continued)

membrane. The invention relates also to a method for operating a microbial fuel cell.

16 Claims, 3 Drawing Sheets

(51) Int. Cl.
| | |
|---|---|
| *C02F 1/44* | (2006.01) |
| *C02F 3/00* | (2006.01) |
| *H01M 4/90* | (2006.01) |
| *B01D 61/02* | (2006.01) |
| *C02F 103/28* | (2006.01) |
| *C02F 103/32* | (2006.01) |
| *B01D 71/02* | (2006.01) |
| *B01D 71/56* | (2006.01) |
| *C02F 103/10* | (2006.01) |

(52) U.S. Cl.
CPC .............. *C02F 1/442* (2013.01); *C02F 3/005* (2013.01); *H01M 4/9008* (2013.01); *B01D 71/024* (2013.01); *B01D 71/56* (2013.01); *B01D 2311/2603* (2013.01); *C02F 2103/10* (2013.01); *C02F 2103/28* (2013.01); *C02F 2103/32* (2013.01); *C02F 2201/46115* (2013.01); *C02F 2209/001* (2013.01); *C02F 2209/003* (2013.01); *C02F 2209/04* (2013.01); *C02F 2209/05* (2013.01); *C02F 2209/06* (2013.01); *Y02E 60/527* (2013.01)

(56) References Cited

U.S. PATENT DOCUMENTS

| | | |
|---|---|---|
| 2013/0017414 A1 | 1/2013 | He |
| 2016/0190627 A1* | 6/2016 | Danzer .................. H01M 8/16 210/601 |

FOREIGN PATENT DOCUMENTS

| | | |
|---|---|---|
| WO | 2010071059 A | 6/2010 |
| WO | 2015014474 A1 | 2/2015 |
| WO | 2013069889 A1 | 5/2016 |

OTHER PUBLICATIONS

Finnish Patent and Registration Office, Search Report of FI20156023, dated Jun. 22, 2016.
Kakarla, R. et al., Enhanced performance of an air-cathode microbial fuel cell with oxygen supply from an externally connected algal bioreactor, Bioresource Technology, Jun. 2015, vol. 195, pp. 210-216. abstract; p. 211, left-hand column, lines 24-29 & right-hand column, lines 7-8, 1-16, 19-35; p. 215, right-hand column, lines 3-14.
J Alane: "Filmtec(TM) Membranes Basics of RO and NF: Principle of Reverse Omosis and Nanofiltration", • Apr. 1, 2008 (Apr. 1, 2008). XP055350527. http://msdssearch.dow.com/Publishedliteratur eDOWCOM/dh003b/0901b8038003b454.pdf?filepath= liquidsepsfpdfsjnoregj609-02003.pdf& fromPage=GetDoc Retrieved from the Internet: URL:http://www.dow.comjen-usjelibrary [retrieved on Mar. 1, 2017] p. 3. lines 9-22; figures 1.6-1.9.

* cited by examiner

MICROBIAL FUEL CELL ARRANGEMENT AND METHOD FOR OPERATING IT

PRIORITY

This application is a U.S national application of the international application number PCT/FI2016/050934 filed on Dec. 29, 2016 and claiming priority of Finnish national application FI20156023 filed on Dec. 29, 2015, the contents of both of which are incorporated herein by reference.

Field of the Invention

The invention relates to a microbial fuel cell arrangement and a method for operating a microbial fuel cell arrangement according to the preambles of the enclosed independent claims.

Background of the Invention

Microbial fuel cell (MFC) provides an alternative for energy generation. It offers a possibility to convert chemical energy into electrical energy by using microorganisms. A typical microbial fuel cell comprises a cell reactor with an anode and a cathode, which are connected to each other through an external electrical circuit. On the anode side of cell reactor organic substances in an aqueous liquid medium are oxidized by microorganisms. The oxidation generates carbon dioxide, electrons and protons. Some microorganisms, which are called exoelectrogens, release some of the electrons produced from cell respiration to the anode. The electrons are transferred via the external circuit to the cathode, and the protons are transferred to the cathode through the liquid medium. Electrons and protons are then consumed in chemical reaction(s) at the cathode. For example, in wastewater treatment electrons and protons are consumed at the cathode, combining with oxygen, e.g. from air, and forming water according to the reaction:

$$O_2 + 4H^+ + 4e^- \rightarrow 2H_2O$$

Aqueous liquid medium is fed into a microbial fuel cell as an influent, and treated liquid medium is withdrawn from the cell as effluent. Quality of the effluent obtained from the microbial fuel cell is of importance in practical applications. The effluent quality, i.e. the reduction of organic substance in the microbial fuel cell, depends on many different parameters, such as influent characteristics, operation temperature, hydraulic retention time, electrode materials and/or reactor type. Organic substances, which are not consumed in microbial fuel cell as well as dissolved solids exit the microbial fuel cell reactor together with the effluent stream or cause fouling of the cell reactor itself. The effluent stream from the microbial fuel cell may even require an additional treatment stage in order to meet discharge and/or reuse requirements.

In continuous flow mode, the removal of organic substances in microbial fuel cell is improved with a longer hydraulic retention time (HRT). Hydraulic retention time denotes the average length of time that the liquid medium remains in the cell reactor between the inlet and outlet. The overall power generation in the microbial fuel cell is reduced with long hydraulic retention time as the average concentration of organic substances within the microbial fuel cell decreases from inlet to outlet due to the microbial activity. In general exoelectrogens are able to produce less power from influent feed, which has low conductivity and low organic substance content. Thus in a conventional continuous flow microbial flow cells the hydraulic retention time is selected in order to optimise either the energy production of the cell or the quality of the produced effluent, or a compromise is made between the both. However, there is a desire to be able to improve the energy production of a microbial fuel cell and simultaneously maintain the removal of organic substances within the microbial fuel cell at high level.

Summary of the Invention

An object of this invention is to minimise or even eliminate the disadvantages existing in the prior art.

Another object of the present invention is to provide a microbial fuel cell arrangement with which it is possible to improve both the energy production and to produce high quality permeate from the microbial fuel cell as well.

A further object of the present invention is to provide a method with which the quality of the influent feed may be controlled and adjusted. The invention provides, for example, possibility to adjust the organic load and/or conductivity of the influent feed.

These objects are achieved and the invention is defined by the features disclosed in the independent claims. Some preferable embodiments of the present invention are presented in the dependent claims. The features recited in the dependent claims are freely combinable with each other unless otherwise explicitly stated.

A typical microbial fuel cell arrangement according to the present invention comprises a cell reactor, which comprises,
  a membrane, which has an active surface and a support surface, as well as a pore size of ≤10 nm and/or a divalent ion rejection of ≥50%,
  an anode and a cathode, which are connected with each other through an external electrical circuit,
  an influent inlet for liquid medium arranged at the active surface side of the membrane and at least one permeate outlet arranged at the support surface side of the membrane,
  an influent line connected to the influent inlet,
  a concentrate outlet, arranged at the active surface side of the membrane and connected to a concentrate line, and
  pressurisation means for creating pressure difference between the active surface side and support surface side of the membrane.

A typical method according to the present invention for operating microbial fuel cell, which comprises a cell reactor, which comprises an anode and a cathode, which are connected with each other through an external electrical circuit, as well as a membrane having an active surface and a support surface, the method comprising
  feeding liquid medium comprising organic substance(s) through an influent inlet at the active surface side of the membrane,
  creating a pressure difference between the active surface side and the support surface side of the membrane,
  allowing a part of liquid medium to permeate through the membrane to the support surface side of the membrane and to form a permeate,
  removing the permeate from the support surface side of the membrane through a permeate outlet,
  removing a part of the liquid medium as a concentrate through a concentrate outlet at the active surface side of the membrane.

All the described embodiments and advantages apply both for the microbial fuel cell as well as to the method according to the present invention, when applicable, even if not always explicitly stated so.

Now it has been found out that by using a specific membrane with limited and/or selective permeability towards different ions while applying a pressure on the active surface side of the membrane, it is possible to operate the microbial fuel cell in a manner that enables stable production of electrical energy while maintaining or improving the quality of the permeate from the microbial fuel cell. The liquid medium entering through the influent inlet into the cell reactor is subjected to pressure, and a part of the liquid medium is filtrated, i.e. permeated, through the membrane to the support surface side of the membrane. This means that the applied pressure forces a part of the liquid medium to diffuse or permeate through the membrane. Thus the liquid medium is filtrated which enables the production of a permeate flow with very low content of organic substances and dissolved solids.

It was found that the present invention provides unexpectedly a plurality of simultaneous improvements. When the liquid medium, i.e. influent, is split into a permeate flow and a concentrate flow, majority of dissolved solids, total suspended solids, total coliforms and residual organic substances of the original liquid medium are exited with the concentrate flow. At the same time the microbial fuel cell arrangement of the present invention effectively degrades organic substances of the liquid medium which is treated and effectively produces electrical power. The degradation of organic substances by exoelectrogens also provides an additional treatment step that may produce permeate with improved quality, even in comparison to permeate obtainable by conventional pressure filtration. For example, the exoelectrogens degrade small organic substances that would otherwise pass conventional filtration membrane and at the same time provide energy production. The present invention thus provides an arrangement and method for liquid medium, for example wastewater or the like, where the microbial fuel cell technique is effectively combined with the principles of pressure filtration.

The membrane has an active surface and a support surface, as well as a pore size of ≤10 nm and/or a divalent ion rejection of ≥50%. The properties of the membrane are selected to provide salt removal and effective filtration of organic substances. In this manner it is possible to reduce salt ions as well as organic substances from permeate.

According to one preferable embodiment of the present invention the anode is arranged at the active surface side of the membrane and the cathode is arranged at the support surface side of the membrane. As only minor amount, if any, of the dissolved solids or residual organic substances enter the support surface side of the membrane, where the cathode is located, the cathode fouling is effectively reduced. The flux of liquid medium through the membrane also improves the proton transfer from the anode to the cathode while the applied pressure ensures that the ion transport from the cathode to the anode is kept minimal.

According to one embodiment of the invention it is possible to obtain a recovery of 10-99%, preferably 40-95%, with the described arrangement and method. The recovery is here understood as the ratio of the permeate flow to the flow of liquid medium, i.e. influent flow.

The liquid medium comprising organic substance(s) is fed through an influent inlet, which is arranged at the active surface side of the membrane. The liquid medium is fed through the inlet to the anode which is located at the active surface side of the membrane.

The cell reactor of the microbial fuel cell arrangement comprises a membrane having an active surface and a support surface. Thus the membrane is a membrane that has an active surface, i.e. a first surface, and a support surface, i.e. a second surface. The active surface and the support surface, i.e. first and second surface, are parallel and backing each other. For example, the membrane may be a sheet-like membrane. The influent inlet and the concentrate outlet are arranged on the same side of the membrane, namely at the active surface side of the membrane.

According to one preferable embodiment the pressurisation means are arranged in connection with the influent line for creating pressure difference between the active surface side and the support surface side of the membrane. The pressurisation means may comprise, for example, a pressure pump arranged in connection with the influent line or means for feeding pressurised gas to the active surface side of the membrane. The pressurisation means, such as pressure pump, create the desired positive pressure level on the active surface side of the membrane. Typically the pressure difference between the active surface side and the support surface side of the membrane is at least 0.5 bar, preferably at least 1 bar. The applied pressure in the active surface side of the membrane is typically in the range of 0.5-5 bar, preferably 1-4 bar, more preferably 2-3.5 bar. On the support surface side of the membrane the pressure level is normally the atmospheric pressure.

The cell reactor may be constructed with a plurality of different ways. According to one embodiment the cell reactor comprises an elongated tubular reactor. The cross-sectional form of the elongated tubular reactor may be circular, elliptical, polygonal or rectangular. The influent inlet may be arranged in/at the first end of the tubular cell reactor and the concentrate outlet is arranged in/at the second end of the tubular cell reactor. The influent inlet and the concentrate outlet are arranged at the active surface side of the membrane. The liquid medium fed to the cell reactor through the influent inlet is transferred through the cell reactor and a part of it is exited through the concentrate outlet. The pressure applied on the active surface side of the membrane forces at least part of the liquid medium through the membrane and to the support surface side of the membrane, where it forms the permeate. At least one permeate outlet is located at the support surface side of the membrane and connected to the permeate line. The support surface side of the membrane may also comprise a plurality of permeate outlets, each outlet being connected to the permeate line. The treated liquid medium exits the reactor as a permeate through the permeate outlet and is transferred from the cell reactor via permeate line to any succeeding process steps. The permeate exiting through the permeate outlet has typically significantly lower concentration of organic substances than the liquid medium which is fed through the influent inlet to the cell reactor. The permeate has also lower concentration of dissolved solids, total suspended solids and/or total coliforms than the concentrate.

The length of a tubular cell reactor may be 10-1000 mm. The diameter or diagonal of the tubular cell reactor may be 0.5-1000 mm.

According to one embodiment of the invention the tubular cell reactor has a diameter in the size range of a hollow-fibre or a capillary, whereby the inside diameter of the tubular cell reactor may be 0.025-5 mm, preferably 0.5-3 mm.

According to one embodiment the cell reactor comprises an elongated tubular reactor which is divided in its axial direction by the membrane, preferably by a planar membrane. The anode is located at the active surface side of the membrane and the cathode is located at the support surface side of the membrane.

According to another embodiment the membrane divides the tubular reactor concentrically. According to one embodiment of the invention the anode is located at the active surface side of the concentrically arranged membrane, for example inside the concentrically arranged membrane. The cathode is located concentrically at the support surface side, i.e other side, of the membrane.

The tubular reactor may also comprise a casing arranged to surround the anode, membrane and the cathode.

According to one embodiment of the invention the arrangement comprises a casing, which comprises a plurality of individual tubular cell reactors. In this case, the individual tubular cell reactors are arranged inside the casing and parallel with each other. The casing may have a packing density in the range of 5-50%, preferably in the range of 10-35%. In some embodiments the packing density is in the range of 10-25%.

According to one preferable embodiment of the invention the anode and the cathode are arranged in immediate and direct contact with the membrane, on different sides of the membrane. The cathode, anode and membrane form thus a sandwich structure. The close spacing of the anode and cathode reduces resistance within the microbial fuel cell. The membrane between the anode and cathode provides electrical insulation that prevents short-circuit of the cell. In some embodiments a separate water permeable insulation layer may be incorporated into the membrane structure.

According to one embodiment of the invention the anode and the cathode are arranged at the active surface side of the membrane. In this embodiment the anode and cathode are separated by a sufficient distance or by an electrically non-conductive separator, which is arranged between the anode and the cathode, in order to prevent short-circuit. Suitable separator materials are e.g. tissue and the like. In this embodiment the protons are transferred from anode to cathode without membrane barrier. Membrane may be arranged as an outer layer on the cathode.

According to one preferable embodiment of the invention the membrane is a semipermeable reverse osmosis (RO) membrane. The reverse osmosis membrane comprises an active layer of polymer, arranged on a polymeric support. The active polymer layer forms the active surface of the membrane. The polymeric support can be made, for example, of polysulfone or polypropylene. The polymeric support may have a thickness of 1-10 µm. The active layer acts as a barrier for organic substances and ions present in the liquid medium. The active layer is, however, permeable for water molecules. The active layer is preferably made of polyamide or cellulose acetate. The thickness of the active layer is typically ≤2 µm and smaller than the thickness of the polymeric support.

According to another embodiment of the invention the membrane is a nanofiltration membrane, which has divalent ion rejection≥50%, preferably ≥60%, more preferably ≥70%. The pore size of the nanofiltration membrane may be in the range of 1-100 nm, preferably 2-10 nm. Nanofiltration membranes may be made from polymeric or inorganic materials. For example, a synthetic polymer such as polyamide or poly (piperazinamide) may be used as membrane material. Alternatively, nanofiltration membranes can be made from inorganic materials, such as aluminium oxides, titanium oxides, zirconia oxides, silicon carbide. Nanofiltration membranes may also comprise a selective layer attached or deposited on the membrane.

The microbial fuel cell arrangement comprises at least one anode and at least one cathode. The anode(s) and the cathode(s) are connected with each other through an external electrical circuit. According to one embodiment of the invention the anode and cathode comprise a mixture of one or more electrically conductive materials and optionally metal catalyst(s), preferably nonprecious metal catalyst(s). The electrically conductive material may be arranged or attached on a support which can have a high surface area. The anode and/or cathode may comprise a mixture of materials selected for example, from metals, carbon or polymers, and optionally also suitable functional materials, such as ion exchange materials.

According to one embodiment of the invention the anode is preferably constructed to provide a large surface area for exoelectrogenic biofilm to grow on. The anode may have a volumetric specific surface area of 1000-6 000 000 $m^2/m^3$. The anode is connected to an anode current collector, which collects the electrons from the anode surface and conducts the electrons through the external electrical circuit to the cathode. The anode current collector is constructed permeable for liquid medium and it may also be constructed in a manner that the liquid medium flow on the anode surface is enhanced or improved.

According to one embodiment of the invention the cathode is preferably constructed to provide a large surface area for chemical reactions and a gas diffusion layer. The cathode may have a volumetric specific surface area of 6000-6 000 000 $m^2/m^3$. On the cathode an oxidative medium, such as air, is used as an electron acceptor. Thus the electrons and protons react with the oxidative medium at the cathode. The performance of the cathode may be optionally enhanced by a catalyst, which is incorporated to the cathode, such as platinum, activated carbon or iron(II) phthalocyanine. The cathode is connected to a cathode current collector, which transfers the electrons to cathode material. The cathode current collector is constructed permeable for liquid medium and it may also be constructed to provide structural support against the pressure applied. The cathode current collector may also be constructed in a manner that the air flow to the cathode surface is enhanced or improved.

According to one preferable embodiment of the invention the cathode is an air cathode, especially when the liquid medium is waste water from an industrial process or from a municipal waste water treatment process.

According to one embodiment of the invention the cell reactor has at least one inlet for air in order to provide oxygen for the cathode. Air is introduced, e.g. pumped, through the air inlet to the cathode and air exits the cell reactor via the permeate outlet and the permeate line. If the cathode is placed at the support surface side of the membrane, the air flow prevents the flooding of the cathode by permeate as the permeate is quickly transferred to the permeate outlet with the air flow.

The active surface side of the membrane has the concentrate outlet, which is connected to the concentrate line. According to one embodiment of the invention the arrangement comprises also a recirculation line, which is arranged to connect the concentrate line and the influent line. Preferably at last a part of the concentrate is recirculated back to the influent line of the microbial fuel cell reactor. According to one embodiment it is possible to recirculate 0-95 volume-%, preferably 1-90 volume-%, more preferably 5-80 volume-%, of the concentrate exiting the microbial fuel cell. Thus the concentration of organic substances in the liquid medium which is fed to the microbial fuel cell can be maintained at sufficient level for effective performance of exoelectrogens and for effective and stable energy production. The quality of the liquid medium can be optimised to maximise exoelectrogenic activity in the microbial fuel cell and to reduce cell resistance. The quality of the liquid medium can be easily adjusted by controlling the amount of concentrate which is recirculated from the concentrate line to the influent line. Also the conductivity of the liquid medium, i.e. the electrolyte concentration, can be also improved and optimized with recirculation of the concentrate. Providing a liquid medium with high conductivity it is possible to decrease ohmic loss in the fuel cell.

The recirculation line may comprise pH regulating means. pH regulating means may comprise suitable device for injection of an acid, a base or any suitable buffer solution into the liquid medium flow of the recirculation channel. Thus it is possible to adjust pH of the concentrate before it is recirculated back to the influent line. Typically the pH is adjusted to a range of 6-10, preferably 7-9. The adjustment of pH of the recirculated concentrate makes it possible to reduce the risk for unfavourable acidic conditions in vicinity of the anode.

According to one embodiment of the invention the arrangement comprises at least one sensor means for measuring the quality of the liquid medium, i.e. influent, permeate and/or concentrate, arranged in connection with the influent line, permeate line and/or concentrate line. For example, the sensor means may comprise one or several sensors selected from pH sensors, conductivity sensors, redox sensors and/or sensors for determining the concentration of biodegradable organic substances, and these sensors are used to measure the pH value, conductivity, redox value and/or concentration of biodegradable organic substances in the concentrate. These same values may also be measured from the liquid medium, i.e. influent flow, and/or permeate flow by arranging corresponding sensor means in connection with the influent line and/or permeate line for measuring properties of the liquid medium which is used as influent or which exits the cell reactor as permeate. The measurement results describing the quality of the liquid medium, permeate and/or the concentrate can be used to determine or adjust the volume of concentrate which is recirculated from the concentrate line back to the influent line.

A hydrolysis unit may be arranged before the influent inlet in connection with the influent line. This enables hydrolysing of at least part of the liquid medium before feeding to the cell reactor. If the liquid medium, which is used as influent, contains slowly biodegradable organic substances, it can be hydrolysed prior it is fed to microbial fuel cell. Also if the concentrate from the microbial fuel cell comprises slowly biodegradable organic substances, at least a part of the concentrate can be hydrolysed in the hydrolysis unit. After hydrolysis unit the concentrate can be directed to the influent line of the microbial fuel cell and mixed with the liquid medium.

According to one embodiment the membrane of microbial fuel cell arrangement can be cleaned chemically or mechanically. The cleaning can be performed, for example by backflushing with pressurised nitrogen. The cleaning operation can be performed at predetermined time intervals, or the cleaning can be performed when permeate quantity and/or quality is reduced under a predetermined level.

According to one embodiment of the present invention the liquid medium, which is used as an influent is preferably selected from effluents from pulp and paper industry process, oil and gas industry process, or mining process. The liquid medium to may also originate from food or beverage industry, for example from brewery or dairy. According to another embodiment of the invention the liquid medium is municipal or agricultural wastewater.

Brief Description of the Drawings

In the following, the invention will be described in more detail with reference to the appended schematic drawing, in which.

Detailed Description of the Invention

Figure 1:
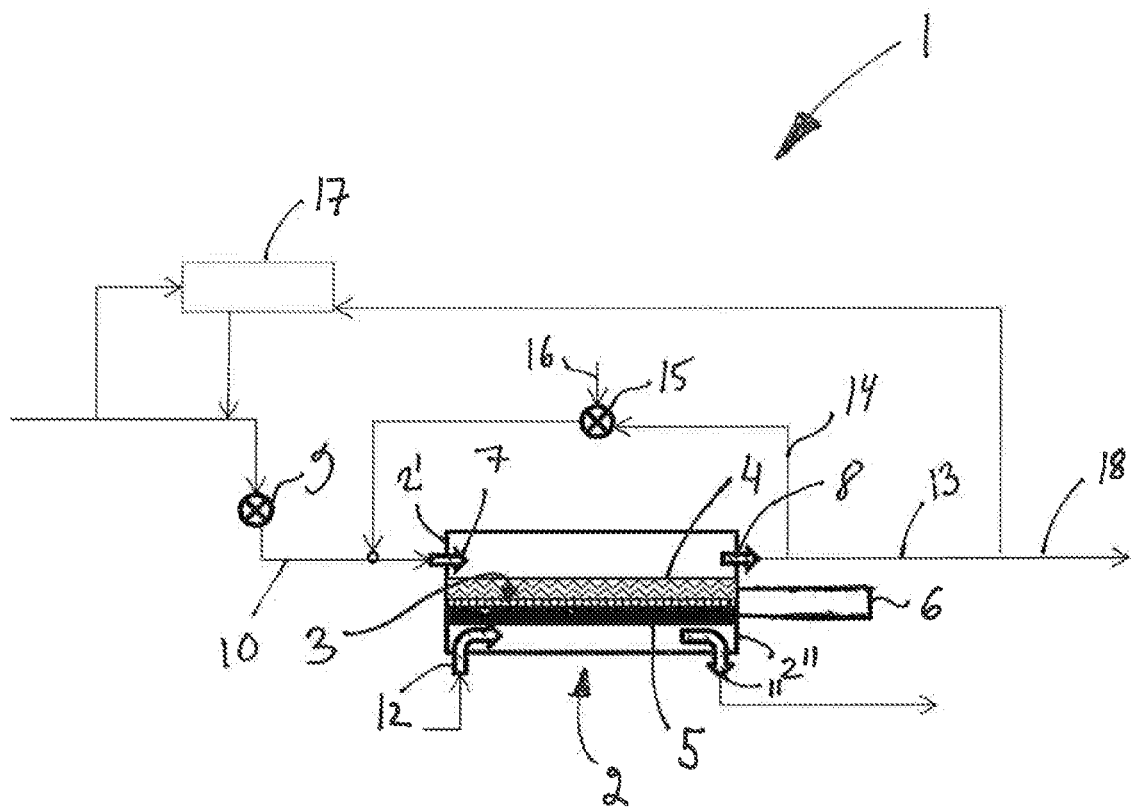
FIG. 1 shows an exemplary arrangement according to the invention.

FIG. 1 shows a microbial fuel cell arrangement 1. The arrangement comprises a cell reactor 2, which is divided by a membrane 3. In the embodiment shown in FIG. 1 the membrane 3 is a reverse osmosis membrane. At the active surface side of the membrane 3 is arranged an anode 4 and at the support surface side of the membrane is arranged a cathode 5. Anode 4 and cathode 5 are connected with each other through an external electrical circuit 6.

In the first end 2' of the cell reactor 2, at the active surface side of the membrane 3, is arranged an influent inlet 7 and in the second end 2" of the cell reactor 2, at the active surface side of the membrane 3, is arranged a concentrate outlet 8. Liquid medium that enters the cell reactor 2 through the influent inlet 7 is partly filtrated through the membrane 3 by the pressure difference between the active surface side and the support surface side of the membrane 3. The positive pressure on the active surface side is created by the pressurisation means 9, such as pressure pump, arranged in connection with the influent line 10 leading to the influent inlet 7. The part of the liquid medium, which does not permeate through the membrane 3 is exited from the cell reactor 2 through the concentrate outlet 8. The liquid medium that permeates the membrane 3 to the support surface side of the membrane 3 is exited through a permeate outlet 11.

Air may be fed to the support surface side of the membrane through an air inlet 12. Air may exit the support surface side through the permeate outlet 11 or through a separate air outlet (not shown).

A part of the concentrate flow can be recirculated from the concentrate line 13, which connected to the concentrate outlet 8, back to the influent line 10 via a recirculation line 14. Recirculation line 14 may comprise a recirculation pump 15, as well as pH regulating means for optimising the pH of the concentrate before it is combined with the liquid medium used as an influent. A flow 16 of suitable chemical, such as base or buffer may be added to the recirculation line. A part of the concentrate flow can be exited the arrangement 1 as an excess flow 18.

The arrangement 1 may also comprise a hydrolysis unit 17. A part of the liquid medium can be treated in the hydrolysis unit 17 before it is fed to the cell reactor 2. Alternatively, or in addition a part of the concentrate flow can be directed to the hydrolysis unit 17 for hydrolysis of slowly biodegradable organic substances. After hydrolysis this hydrolysed concentrate may be introduced to the liquid medium before it is fed to the cell reactor 2.

EXPERIMENTAL

Some embodiments of the invention are described in the following non-limiting examples.

Construction of the Microbial Fuel Cell Arrangement Used in the Experiments

A microbial fuel cell reactor, which comprised an anode chamber and a cathode chamber, similar to that shown in FIG. 1 was assembled in laboratory. The cell reactor was operated positioned in upright. The anode side comprised an influent inlet and a concentrate outlet and the cathode side comprised a permeate outlet. The casing of the cell reactor was made of plastic (acetal). A single piece of rectangular membrane was arranged in the cell. The membrane was supported by a porous stainless steel plate that also functioned as a permeate carrier. The permeate flow was collected in manifold before exiting through the permeate outlet.

Through the casing of cell reactor two metal alloy screws were bored. The first screw penetrated the casing into the anode chamber and the second screw penetrated the casing on the permeate side. In Examples 1 and 2 a folded metal alloy strip was soldered to the tip of the screw on the anode side.

Two additional flow connections were made to the cathode side of the cell reactor, in order to allow air to the cathode side and upright position of membrane. In Examples 1 and 2 the cell reactor configuration allowed simultaneous flow of air through the cathode side and outflow of the permeate from the cathode side.

Anode comprised stainless steel meshes, which were placed on top of each other in the anode chamber. The area of one layer was 34 cm$^2$. In Examples 1 and 2 one of the stainless steel meshes of the anode was in contact with the folded alloy metal strip, which thus connected the anode to the external circuit. In Example 2 a carbon cloth was placed between the meshes and the membrane. Anode chamber volume was 7.5 ml.

An air cathode was used as cathode. Cathode comprised a carbon cloth, which was placed between the membrane and a metal plate. The carbon cloth contained a gas diffusion layer with 2 mg/cm$^2$ platinum as catalyst. Active cathode area was 34 cm$^2$.

The influent feed was pumped from the feed tank to the influent inlet of the cell reactor. The feed tank volume was ca. 0.6 l in Examples 1 and 2 and ca. 2.2 l in Example 3. The influent inlet was arranged on the lower part of the anode chamber. The concentrate outlet was arranged on the upper part of the anode chamber. Anode side was pressurized by feeding pressurised nitrogen gas to the anode side. A portion of the liquid medium permeated through the membrane to the cathode side and flowed through the permeate carrier. In Examples 1 and 2 humified air was pumped on the cathode side through two upper inlet connections. Permeate flowed out with air through the permeate outlet connection into a permeate collection vessel.

The concentrate stream, which contains the material rejected by the membrane, exited the cell reactor through the concentrate outlet and was directed back into the feed tank.

Operation of the Microbial Fuel Cell Arrangement

A variable external resistor was connected between the anode and the cathode electrodes. Anode potential against cathode potential was measured at 10 minute intervals. The cell voltage and external resistor value were used to calculate power and current. All power production (W/m$^3$) results are expressed in relation to anode chamber volume.

The arrangement was fed with a liquid medium comprising either brewery wastewater or a mixture of effluents from other microbial fuel cells which had been fed with pre-fermented brewery wastewater.

The pressure applied on the anode side was ca. 3.5 bar, and the cell reactor operated at ca. 30° C. temperature. Liquid medium was circulated in the arrangement at a flow rate of ca. 20 l/h. Air was pumped through the cathode at a flow rate of ca. 2 l/min.

The arrangement was operated in batch mode. An influent batch was recirculated in the arrangement until the concentrate was removed and new influent batch was put to the feed tank. At the same time the permeate vessel was also changed.

Analysis of soluble COD was performed from the liquid medium at the start of each batch and from permeate and concentrate after finishing each batch. Conductivity was also measured. Influent, permeate and concentrate were weighed for each batch.

Example 1

The reactor of the microbial fuel cell comprised an anode electrode made of 3 layers of stainless steel mesh, a membrane which was a polyamide reverse osmosis membrane and a cathode electrode which was a carbon cloth with catalyst.

First 3 batches were run using effluents from other microbial fuel cells as influent. Then 3 consecutive batches were run using brewery wastewater as influent. Then the pH of the concentrate went below 7, and the following batches were run using again effluents from other microbial fuel cells as influent. As dissolved solids removal and permeate flow decreased over time, the membrane was cleaned by performing an air backflush on day 23 between batches 9 and 10. A total of 13 batches were run. The duration of each batch varied between 1-7 days.

Figure 2:
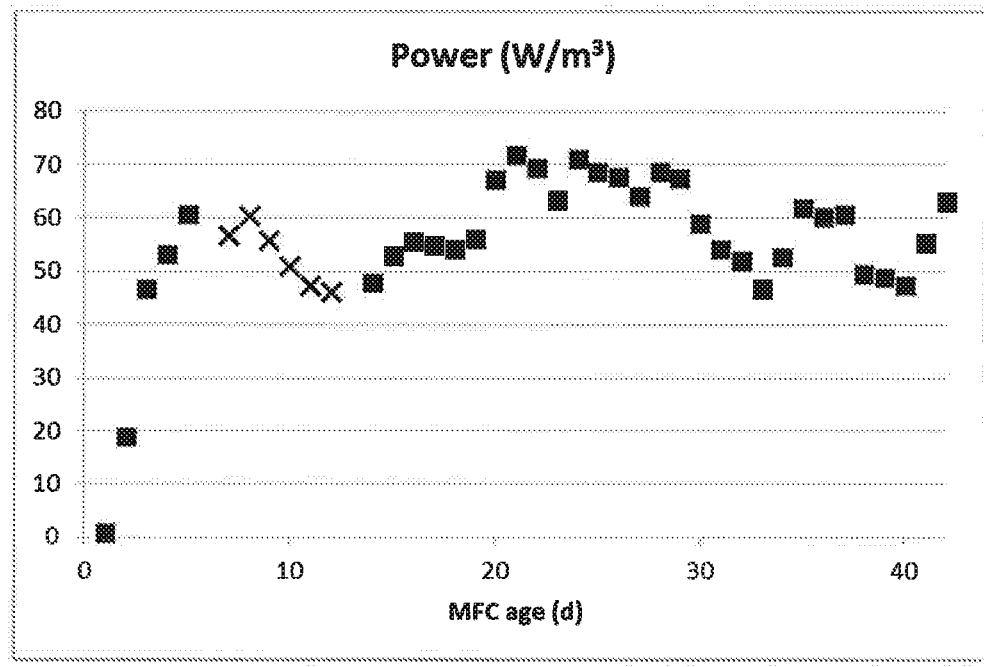
FIG. 2 shows the daily average of power production, expressed in $W/m^3$, based on the anode chamber volume.

FIG. 2 shows the daily average of power production, expressed in W/m$^3$, based on the anode chamber volume. The data points for batches using brewery wastewater as influent are indicated with crosses, the data points for batches using microbial fuel cell effluents as influent are indicated with black squares.

Power generation started after 2 days of operation. It can be seen from FIG. 2 that when the influent was changed to untreated brewery wastewater, power decreased although soluble COD concentration of the influent changed from 1100 mg/l to 3500 mg/l. It was assumed that the untreated wastewater started to ferment within the microbial fuel cell arrangement, suppressing exoelectrogenic activity and lowering the pH of the concentrate.

The coulombic efficiency (CE %) was calculated for each batch using the ratio of total coulombs obtained, $C_{out}$ to the theoretical amount, $C_{in}$, available from complete influent oxidation:

$$CE\% = C_{out}/C_{in} \times 100\% = (I \times t)/((F \times n \times \Delta COD)/M)$$

where
l is the average current (A), calculated from cell voltage and resistor value;
t is the time interval;
M is the molecular weight of oxygen;
F is the Faraday constant;
n is the number of electrons exchanged per mole of oxygen;
ΔCOD is the weight of removed amount in soluble COD.

Figure 3:
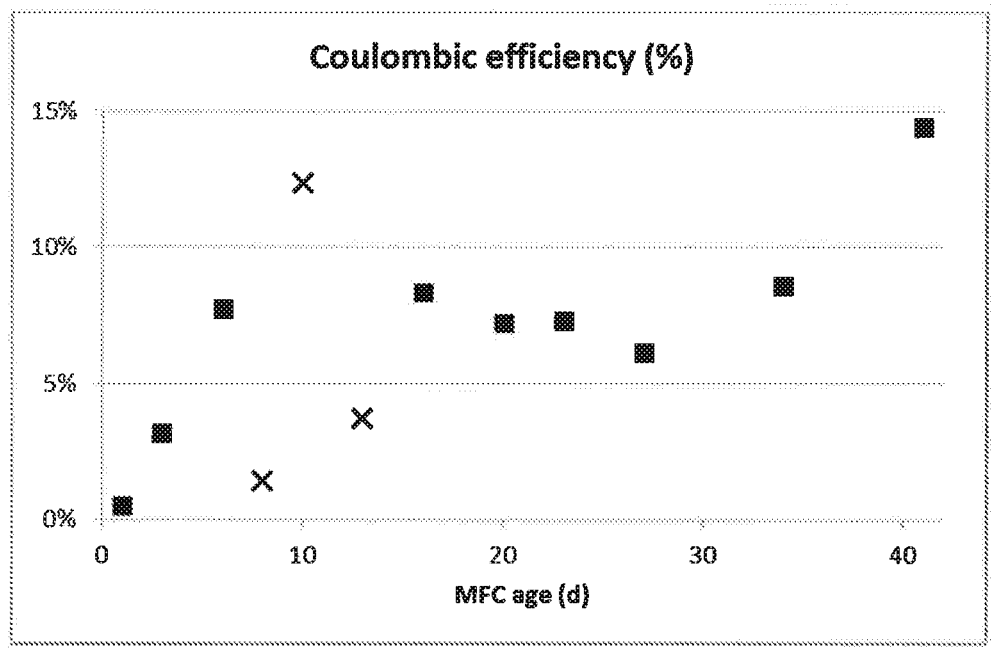
FIG. 3 shows the coulombic efficiency of the microbial fuel cell of Example 1, described in further detail below.

FIG. 3 shows the coulombic efficiency of the microbial fuel cell of Example 1. The data points for batches using brewery wastewater as influent are indicated with crosses, the data points for batches using microbial fuel cell effluents as influent are indicated with black squares.

Open circuit voltage of the microbial fuel cell arrangement was in the beginning exceptionally high, 910 mV. However, in later measurements the open circuit voltage was between 780-830 mV. An oxide layer accumulated on the metal alloy surface over time thus increasing resistance within the electrical circuit.

Volatile Fatty Acid (VFA) analysis was performed for influent, concentrate and permeate of batches 6 and 7 of the Example 1. The results of VFA analysis are shown in Table 2.

Example 2

The reactor of the microbial fuel cell comprised an anode electrode made of 2 layers of stainless steel mesh and a carbon cloth, a membrane which was a polyamide reverse osmosis membrane, and a cathode electrode, which was a carbon cloth with catalyst.

First 7 batches were run using effluents from other microbial fuel cells as influent, and the last 2 batches were run using brewery wastewater as influent. The duration of each batch varied between 1-5 days.

During the first 3 batches cell voltage was very low. The cell was opened, and connection to the external circuit on cathode side was fixed on day 7.

Figure 4:
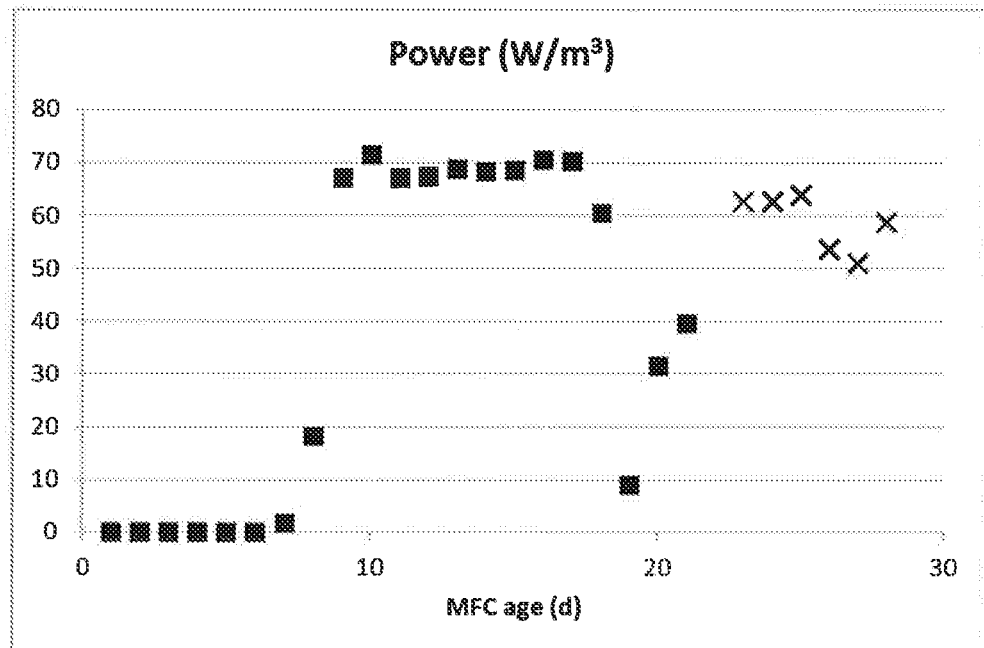
FIG. 4 shows the daily average of power production, expressed in W/m3, based on the anode chamber volume.

FIG. 4 shows the daily average of power production, expressed in W/m$^3$, based on the anode chamber volume. The data points for batches using brewery wastewater as influent are indicated with crosses, the data points for batches using microbial fuel cell effluents as influent are indicated with black squares.

The batch number 6 of Example 2 was run until power production declined rapidly on day 19. The soluble COD value of the concentrate was low, below 300 mg/l, as expected. The batch number 7 of Example 2 had very low soluble COD value already in the start of the batch. This is apparent also from power production in FIG. 4.

It can be seen from FIGS. 2 and 4 that the highest power production is at the similar level for Examples 1 and 2 despite the different anode configurations. The highest open circuit voltage, OCV, was 850 mV in Example 2. Even though carbon cloth has lower conductivity than the metal mesh, it provides more surface area for biofilm to grow.

The anode configuration of Example 2 removed more soluble COD than the anode configuration of Example 1, which is seen from Table 1. The anode configuration of Example 2 also tolerated the influent comprising untreated wastewater better, as the concentrate pH did not go below 7 during those batches.

Example 3 (Reference)

The cell reactor comprised an anode electrode made of 5 layers of stainless steel mesh and a carbon cloth, a membrane which was a polyamide reverse osmosis membrane and a cathode electrode, which was a carbon cloth with catalyst.

In Example 3 there was no folded metal strip on the anode side touching the stainless steel meshes of the anode, and therefore the anode was not properly connected to the external electrical circuit. Consequently there was not a working microbial fuel cell arrangement. This was reflected in cell voltage which was at highest 1 mV at 500 Ohm and 7 mV at ca. 10 kOhm. The highest open circuit voltage with this configuration was 480 mV. The permeate flow pattern on the cathode side also caused cathode flooding. The conditions did not favour exoelectrogenic activity.

First batch was run using a mixture of microbial fuel cell effluents and brewery wastewater as influent. Following 6 consecutive batches were run using brewery wastewater as influent. The duration of each batch varied between 2-5 days.

Example 4 (Reference)

A filtration unit was used to filtrate brewery wastewater. Plain pressure filtration at 3.5 bar and with the same type of reverse osmosis membrane as used in the microbial fuel cell examples was run for 20 hours. The VFA analysis of this filtration is included in table 2.

Comparison of Examples 1-4

In Table 1 the unfavourable conditions of Example 3 are compared against key results from working microbial fuel cells of Examples 1 and 2 having a pressure applied on the anode side. All the given results are average values. In terms of the organic load, the permeate quality of the results for Example 1 and 2 are significantly better, even when untreated brewery wastewater was used as influent. The reduction in soluble COD concentration from influent to permeate is 95% in Example 1, 97% in Example 2 and only 83% in Example 3.

In Table 2 VFA composition of influent, concentrate and permeate are compared for selected batches of Example 1 and Example 4.

Batch 6 of Example 1 used untreated brewery wastewater as influent and batch 7 of Example 1 used effluent of other microbial fuel cells as influent. Example 4 used untreated brewery wastewater as influent.

It can be observed that the VFA concentration of microbial fuel cell permeate is slightly lower than that of conventional reverse osmosis filtration.

TABLE 1

Conductivity, soluble COD and pH for examples 1, 2 and 3.

| | Example 1 | Example 2 | Example 3 (reference) |
|---|---|---|---|
| Feed conductivity (mS/cm) | 2.1 | 2.3 | 1.9 |
| Concentrate conductivity (mS/cm) | 3.5 | 3.3 | 2.6 |
| Permeate conductivity (mS/cm) | 1.5 | 1.4 | 0.6 |
| Feed CODsol (mg/L) | 1900 | 1500 | 3200 |
| Concentrate CODsol (mg/L) | 2200 | 600 | 3600 |
| Permeate CODsol (mg/L) | 100 | 40 | 560 |
| Concentrate pH | 7.5 | 7.6 | 6.1 |
| Permeate pH | 9.2 | 9.1 | 7.6 |

TABLE 2

VFA composition for Examples 1 and 4.

| | | Acetic acid (ppm) | Propionic acid (ppm) | Butyric acid (ppm) | Valeric acid (ppm) | VFA concentration (ppm) |
|---|---|---|---|---|---|---|
| Example 1, batch 6 | influent | 739 | 323 | 541 | 29 | 1631 |
| | concentrate | 2 | 473 | 400 | 226 | 1100 |
| | permeate | 38 | 5 | 1 | 1 | 45 |
| Example 1, batch 7 | influent | 586 | 219 | 41 | 48 | 894 |
| | concentrate | 689 | 379 | 151 | 120 | 1339 |
| | permeate | 25 | 2 | 1 | 1 | 28 |

TABLE 2-continued

VFA composition for Examples 1 and 4.

| | | Acetic acid (ppm) | Propionic acid (ppm) | Butyric acid (ppm) | Valeric acid (ppm) | VFA concentration (ppm) |
|---|---|---|---|---|---|---|
| Example 4 (reference) | influent | 670 | 260 | 72 | 76 | 1078 |
| | permeate | 43 | 12 | 3 | 1 | 59 |

Figure 5:
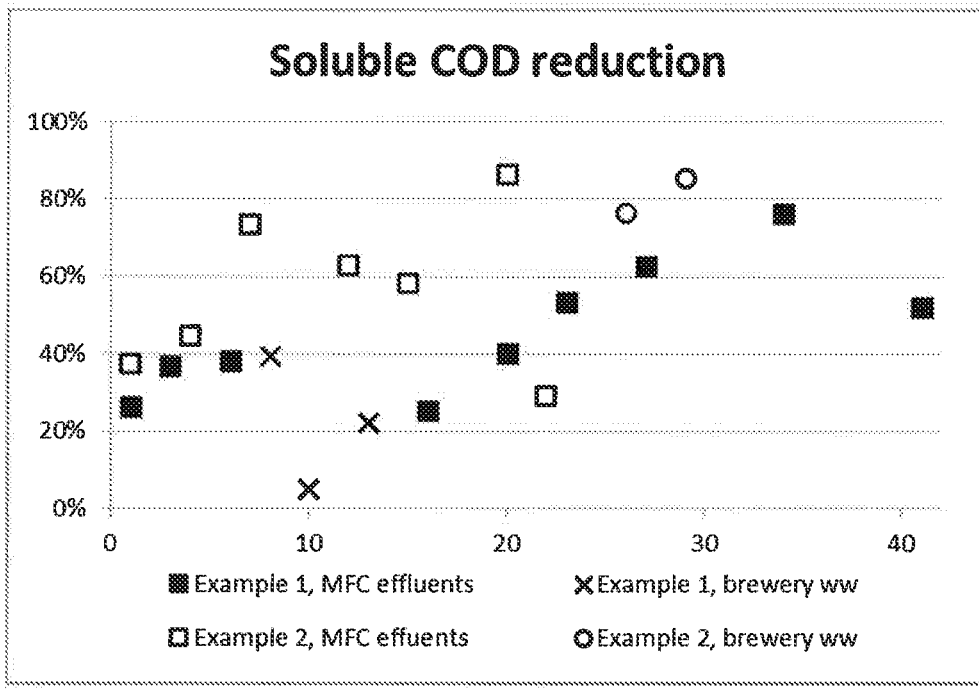
FIG. 5 shows the reduction of soluble COD values, given in percentages, for microbial fuel cells of Examples 1 and 2, which Examples are described in further detail below.

FIG. 5 shows the reduction of soluble COD values, given in percentages, for microbial fuel cells of Examples 1 and 2. The remaining COD in permeate and concentrate is compared to the COD of the influent for each batch. It is seen that Example 2 removes more soluble COD than Example 1. Conventional pressure filtration does not reduce COD value, so FIG. 5 shows the benefit of combining microbial fuel cell and pressure filtration within the same arrangement.

Cell resistances were evaluated using electrochemical impedance spectroscopy, EIS. The scans were run in two electrode mode, using cathode as working electrode. EIS was run for Examples 1 and 2 at 0.7 V and for Example 3 at 0.3 V. Scan results were evaluated using equivalent circuit fitting to Randles circuit with Warburg element. However, results of Example 2 required two charge transfer ($R_{ct}$) and two capacitance elements within the circuit to fit. In Table 3 cell resistances are compared for Examples 1, 2 and 3. Example 3 results clearly show the connection problem within the external electrical circuit.

TABLE 3

Cell resistances evaluated using electrochemical impedance spectroscopy.

| | $R_s$ (Ω) | $R_{ct}$ (Ω) | W (1/Ω/sqrt(Hz)) |
|---|---|---|---|
| Example 1 | 24 | 42 | 17 |
| Example 2 | 15 | 19 | 20 |
| Example 3 | 18 000 | 4 000 | 74 000 |

Even if the invention was described with reference to what at present seems to be the most practical and preferred embodiments, it is appreciated that the invention shall not be limited to the embodiments described above, but the invention is intended to cover also different modifications and equivalent technical solutions within the scope of the enclosed claims.

The invention claimed is:

1. A microbial fuel cell arrangement, comprising a cell reactor, which comprises:
    a membrane, which has an active surface and a support surface, as well as a pore size of ≤10 nm and/or a divalent ion rejection of ≥50%,
    an anode and a cathode, which are connected with each other through an external electrical circuit,
    an influent inlet for liquid medium arranged at the active surface side of the membrane and at least one permeate outlet arranged at the support surface side of the membrane,
    an influent line connected to the influent inlet,
    a concentrate outlet, arranged at the active surface side of the membrane and connected to a concentrate line,
    a recirculation line, which is arranged to connect the concentrate line and the influent line,
    pressurisation means for creating pressure difference between the active surface side and support surface side of the membrane, and
    at least one sensor means for measuring the quality of the liquid medium, a permeate and/or a concentrate, arranged in connection with the influent line, a permeate line and/or the concentrate line.

2. The arrangement according to claim 1, wherein the anode is arranged at the active surface side of the membrane and the cathode is arranged at the support surface side of the membrane.

3. The arrangement according to claim 1, wherein the pressurisation means are arranged in connection with the influent line for creating pressure difference between the active surface side and the support surface side of the membrane.

4. The arrangement according to claim 3, wherein the pressurisation means are arranged to create a pressure in the range of 0.5-5 bar on the active surface side of the membrane.

5. The arrangement according to claim 1, wherein the membrane is a semipermeable reverse osmosis membrane.

6. The arrangement according to claim 1, wherein the membrane is a nanofiltration membrane, which has divalent ion rejection≥50%.

7. The arrangement according to claim 1, wherein the cell reactor is an elongated tubular reactor which is divided in its axial direction by the membrane.

8. The arrangement according to claim 1, wherein the recirculation comprises pH regulating means.

9. The arrangement according to claim 1, wherein a hydrolysis unit is arranged in connection with the influent line before the influent inlet.

10. The arrangement according to claim 1, wherein the cathode is air cathode.

11. The arrangement according to claim 1, wherein the anode and the cathode are arranged at the active surface side of the membrane.

12. A method for operating microbial fuel cell, which comprises a cell reactor, which comprises an anode and a cathode, which are connected with each other through an external electrical circuit, as well as a membrane having an active surface and a support surface, the method comprising
    feeding liquid medium comprising organic substance(s) through an influent inlet at the active surface side of the membrane,
    creating a pressure difference between the active surface side and the support surface side of the membrane,
    allowing a part of liquid medium to permeate through the membrane to the support surface side of the membrane and to form a permeate,
    removing the permeate from the support surface side of the membrane through a permeate outlet,
    removing a part of the liquid medium as a concentrate through a concentrate outlet at the active surface side of the membrane,
    recirculating at least a part of the concentrate back to an influent line, and
    measuring the quality of the liquid medium, the permeate and/or the concentrate and adjusting the volume of the recirculated concentrate on basis of the measurement.

13. The method according to claim 12, wherein the method comprises adjusting pH of the concentrate before it is recirculated back to the influent line, and/or hydrolysing at least part of the liquid medium before feeding to the cell reactor.

14. The method according to claim 12, wherein the ratio of the permeate to the liquid medium fed through the influent inlet is of 10-99%.

15. The method according to claim 4, wherein the applied pressure on the active surface side of the membrane is in the range of 0.5-5 bar and the pressure level on the support surface side of the membrane is the atmospheric pressure.

16. The method according to claim 12, wherein the liquid medium, which is used as influent, is selected from effluents from pulp and paper industry process, from oil and gas industry process, or from mining process, or the liquid medium originates from food or beverage industry, municipal or agricultural waste water.

* * * * *